(12) United States Patent
Read

(10) Patent No.: US 6,230,657 B1
(45) Date of Patent: May 15, 2001

(54) EXAMINATION TABLE FOR ANIMALS

(76) Inventor: Arden E. Read, 12396 Gentry Rd., Beaumont, TX (US) 77713

( * ) Notice: Subject to any disclaimer, the term of this patent is extended or adjusted under 35 U.S.C. 154(b) by 0 days.

(21) Appl. No.: 09/351,871

(22) Filed: Jul. 12, 1999

(51) Int. Cl.[7] ........................ A01K 29/00; A01K 15/04
(52) U.S. Cl. ...................... 119/502; 119/753; 119/28.5
(58) Field of Search ................... 119/28.5, 502, 119/753, 755; D24/183; 108/144.11; 5/600, 611, 86.1

(56) References Cited

U.S. PATENT DOCUMENTS

| | | | |
|---|---|---|---|
| D. 294,752 | * | 3/1988 | Palier ................................ 119/28.5 |
| 3,575,407 | * | 4/1971 | Carson ................................. 5/600 |
| 4,934,320 | * | 6/1990 | Cresap, III ......................... 119/753 |
| 5,072,694 | * | 12/1991 | Haynes et al. ..................... 119/28.5 |
| 5,140,947 | * | 8/1992 | Bruce .................................. 119/502 |
| 5,511,259 | * | 4/1996 | Tarara .................................... 5/600 |
| 5,535,466 | * | 7/1996 | Snell ................................... 119/753 |
| 5,740,884 | * | 4/1998 | DiMuccu et al. ....................... 5/600 |

* cited by examiner

Primary Examiner—Charles T. Jordan
Assistant Examiner—Elizabeth Shaw
(74) Attorney, Agent, or Firm—Locke Liddell & Sapp LLP

(57) ABSTRACT

An examination table for animals and other heavy or uncooperative objects has an examination surface supported by a lift and surrounded by a shroud. The lift moves the examination surface in a vertical direction, thereby allowing an animal to be led, rather than lifted, to the examination surface. The shroud pens the animal in the table, thereby preventing it from leaving the examination surface. In the described embodiment, the lift comprises a motorized scissor lift, and the shroud is attached to the apparatus and includes a hinged door to allow ingress of the object or animal to be examined. Wheels are also provided for the ease of moving the apparatus.

16 Claims, 3 Drawing Sheets

EXAMINATION TABLE FOR ANIMALS

BACKGROUND OF THE INVENTION

1. Field of the Invention

The present invention relates to a table for use in connection with the examination of animals, humans or other objects. The examination table comprises a level surface, lift mechanism and shroud which have particular utility in connection with the examination of animals or other creatures or objects which may be difficult to lift or uncooperative to examination table positioning.

2. Description of Related Information

Examination tables have long been known in the art, and a wide array of such apparati are used for the examination of humans. Many of these tables have tilt mechanisms, and some may be moved up and down to assist patients in positioning themselves on the table. Unlike animals, most humans are cognizant of the examination table, and can cooperate with or at least not hinder positioning on the table.

Animal examination tables have generally not employed lift mechanisms. Traditionally, animals have had to be lifted up to the examination surface. Additionally, such features as a tilt mechanism are not critical to the examination of animals. An examination table for humans that incorporates a lift device is not readily adapted for animals. Apart from the examination table dimensions, an animal generally does not comprehend why an examination table is being raised, may be feared by the movement, and may attempt to leave the examination surface.

In animal hospitals or clinics, the lifting and handling of large animals can be dangerous for both the animal and the handler. Aside from being heavy and difficult to lift, the animal may be uncooperative, and exhibit responses of fear or apprehension that may injure or otherwise endanger the handler. Additionally, the animal may fall off the table during the transition or may move off the table.

A need exists, therefore, for an apparatus that allows an animal or other uncooperative object to be easily lifted to examination height. A need also exists for an apparatus that will prevent an animal or object from injuring or endangering the handler or exiting the examination area.

SUMMARY OF THE INVENTION

The apparatus of the present invention overcomes the above-mentioned disadvantages and drawbacks which are characteristic of the related information. The present invention comprises an examination surface that rests on a lift that moves the examination table in a vertical direction. The examination surface has a starting position that allows an animal to step on the surface without being lifted. The examination surface may then be raised to a height that allows ease of examination.

To prevent the animal from leaving the examination surface, a shroud surrounds the examination surface. In the present embodiment, the shroud comprises an open-top box with a hinged door in one side. The door is opened to allow the animal to be positioned on the examination surface. The animal may be lead through the door by means of a leash. The door is then closed, preventing the animal from jumping off the examination table while it is being raised.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings.

DESCRIPTION OF THE PREFERRED EMBODIMENTS

Figure 1:
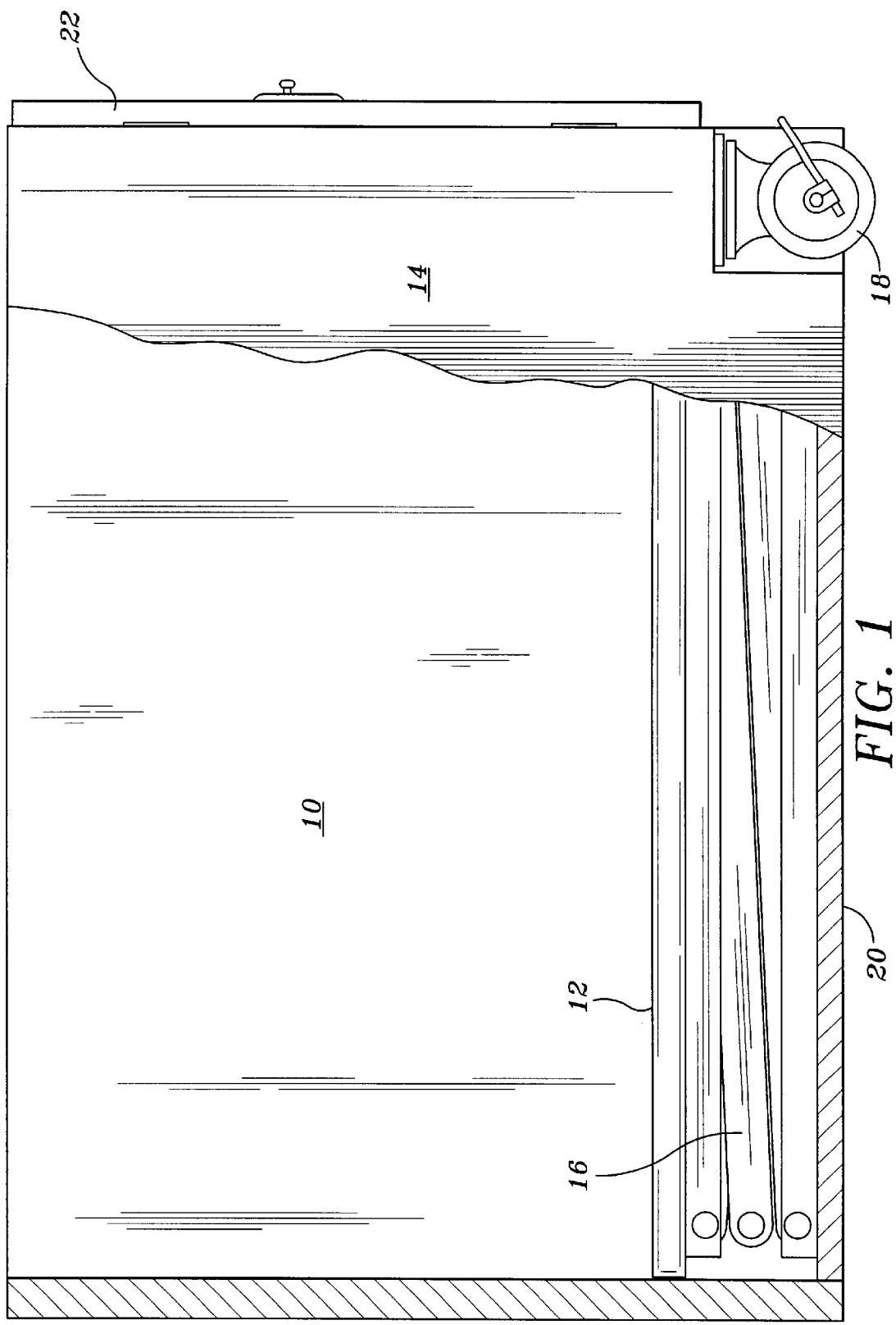
FIG. 1 is side cutaway view of the apparatus of the present invention.
Figure 2:
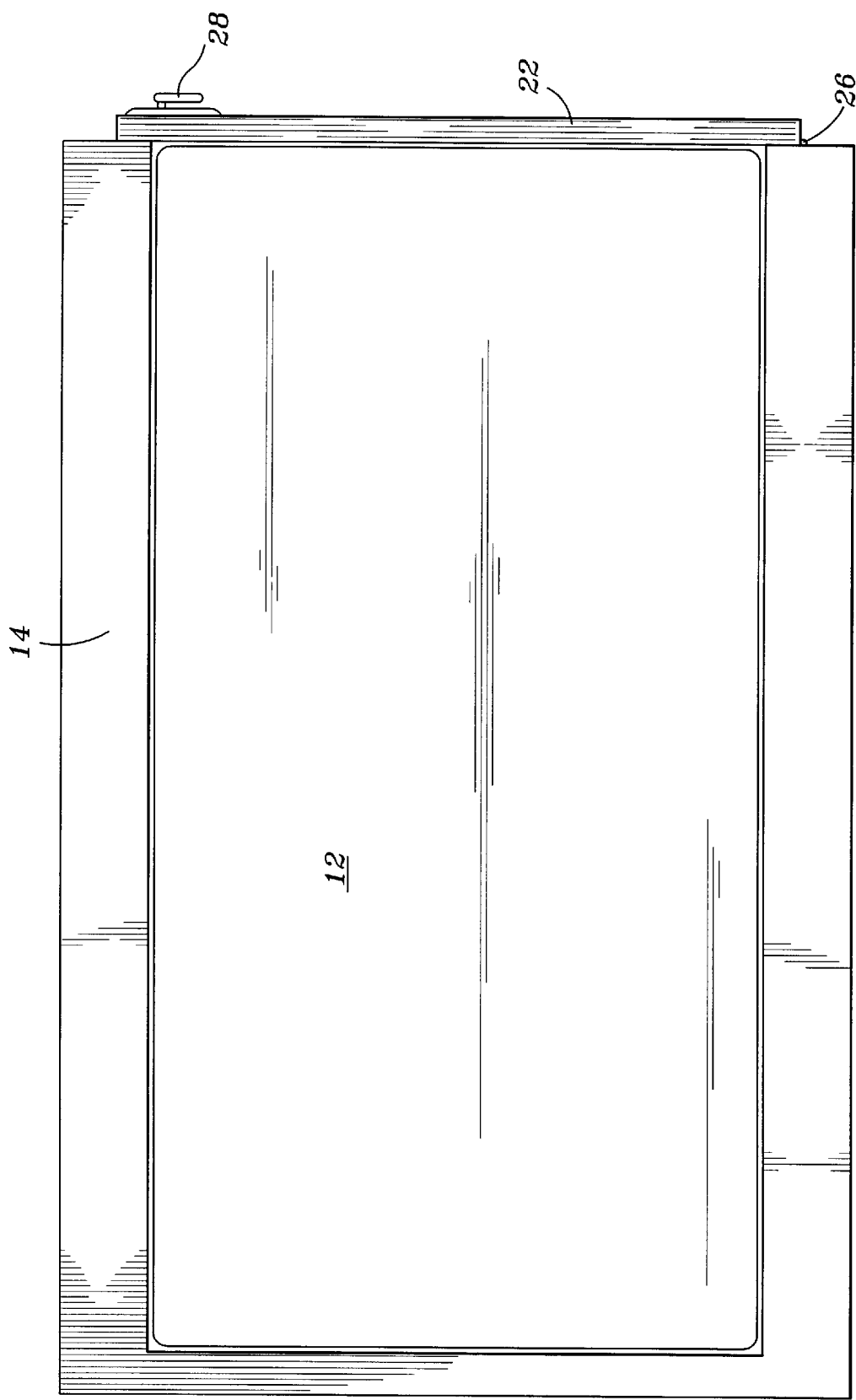
FIG. 2 is an elevated view of the apparatus of the present invention.
Figure 3:
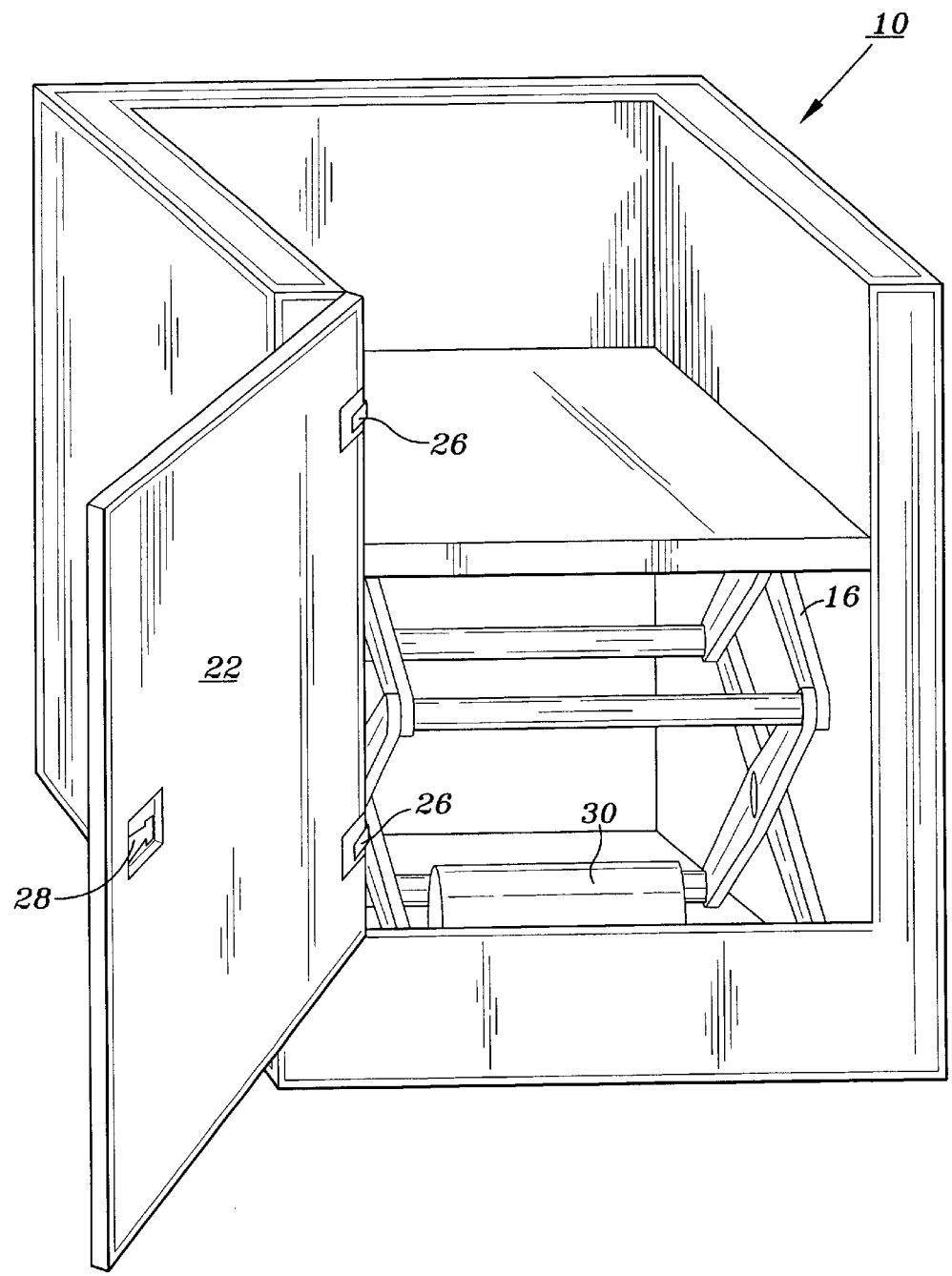
FIG. 3 is a side view of the apparatus of the present invention.

Referring now to the drawings, and particularly to FIGS. 1–3, a preferred embodiment of the apparatus of the present invention is shown.

As shown in FIG. 1, an embodiment of the apparatus 10 of the present invention comprises a table top 12, a shroud 14, a scissor lift 16, and a set of wheels 18. The table top 12 provides an examination surface for animals or other objects.

The table top 12 is attached to the top of a scissor lift 16, which allows the table top 12 to be moved in a vertical direction. Although a motorized scissor lift 16 which employs a hydraulic rod is used in the present embodiment of the invention, those skilled in the art will recognize that other lifting means, such as another type of hydraulic lift or scissor lift or an air bladder, may be used. In the present embodiment, the scissor lift 16 is motorized, which allows the table top 12 to be readily and quickly lifted. However, those skilled in the art will recognize that mechanical lift means, such as a lever or jack, may also be employed. The scissor lift 16 may be stopped at any point, thereby allowing the height to which the examination surface 12 is raised to vary for each animal.

The use of the lift 16 allows an animal to step upon the table top 12 without being lifted. It is also noted that the use of a ramp could be used, which would eliminate the necessity for the animal to step up to the examination surface 12. Although a wide variety of animals can be accommodated without a ramp, a ramp can be used to modify the apparatus for use with inanimate objects.

The lift 16 raises the animal to a height that facilitates ease of examination. The lift 16 may rest directly upon a floor, or, as in the present embodiment, it may rest upon a bottom surface 20 of the apparatus 10.

A shroud 14 is also depicted in FIG. 1. In the present embodiment, the shroud 14 comprises an open-top box with a hinged door 22 in one side. The shroud 14 surrounds the table top 12, thereby enclosing or entrapping the animal to be examined. This prevents the animal from leaving the examination surface 12, and also calms the animal by lessening its awareness of the lifting operation by preventing a visual view of objects around the apparatus. In the present embodiment, the shroud 14 is attached to the apparatus 10 by attachment to the bottom surface 20 of the apparatus 10. However, those skilled in the art will recognize that a removable shroud may be employed. A removable shroud could be positioned around the examination table before or after the animal is positioned on the examination surface 12. The present embodiment employs an attached shroud 14 to facilitate ease of apparatus 10 operation. The attached shroud 14 also speeds the use of the apparatus 10, as an animal does not need to be held in position while the shroud 14 is positioned.

The present embodiment also employs wheels 18. The wheels 18 allow the apparatus 10 to be moved, thereby facilitating a degree of portability.

An elevated view of the apparatus 10 is depicted in FIG. 2. The examination surface 12 is surrounded by the shroud 14. The shroud 14 comprises a door 22 on one side. The door 22 is attached to the shroud by hinges 26, allowing it to be opened and closed. The door 22 is opened to allow an animal to be positioned on the examination surface 12. An animal may be lead through the door 22 by means of a leash. This minimizes the effort required to position the animal. The door 22 may or may not extend to the top of the shroud 14. In the present embodiment, the door 22 extends to the top of the shroud 14. This extension is not critical to the invention, but it allows the animal to be lead to the examination table 12 by a leash without passing the leash through the door and under the top the shroud 14. After the animal is lead through the door 22, the door 22 is then closed, preventing the animal from jumping off the examination surface 12 while it is being raised. In the present embodiment, the examination surface 12 may be raised to any given height up to the height of the shroud 14. It is preferable that the examination surface 12 not be raised to the height of the shroud 14, thereby allowing the shroud 14 to form a lip around the examining surface 12. In this manner, the shroud 14 also serves to form a pen around the animal, preventing it from jumping off the examination surface 12.

Turning now to FIG. 3, another side view of the apparatus 10 is shown. In this side view, the door 22 of the apparatus 10 is open. The door 22 is hinged 26 for easy opening and closing. As a safety feature, a latch 28 secures the door 22 and prevents it from opening when an animal is inside. The scissor lift 16 is shown in a partially raised position, and a motor 30, which powers the lift 16, is shown at the base of the lift 16. The motor 30 allows for ease of operation. The examination surface 12 is partially raised in order to display the lift 16. In normal operation, the examination surface 12 is fully lowered when the door 22 is open.

While a preferred embodiment of the examination table has been described in detail, it should be apparent that modifications and variations thereto are possible, all of which fall within the true spirit and scope of the invention. For example, any suitable lift device may be used instead of the scissor lift described. Also, although the present invention is optimized for use with animals, it should be appreciated that the apparatus herein described is suitable for use with a wide array of difficult to lift or uncooperative objects.

What is claimed is:

1. An examination table comprising:
   an examination table top;
   a table top lifting means for supporting said table top for moving said table top in a generally vertical direction between a first position having a height and a second position, said second position having a height greater than said first position height; and
   a shroud surrounding said table top, said table top being moveable within said shroud between said first and second positions while allowing access to said table top.
2. The examination table of claim 1 wherein said lifting means comprises an inflatable air bladder.
3. The examination table of claim 1 wherein said lifting means comprises a hydraulic lift.
4. The examination table of claim 3 wherein said hydraulic lift further comprises a scissor lift.
5. The examination table of claim 4 wherein said scissor lift further comprises a motor for powering said lift.
6. The examination table of claim 4 and further comprising a plurality of wheels rotatably attached to said scissor lift.
7. The examination table of claim 1 and further comprising a door in said shroud providing an ingress for an animal to be examined.
8. The examination table of claim 1 and further comprising a wheel connected to said table to allow said table to be moved.
9. The examination table of claim 1 and further comprising a plurality of wheels rotatably attached to said shroud.
10. The examination table of claim 1 and further including a ramp adjacent to said table top when said lifting means is in said first position, such that when said table is placed on a floor, said ramp leads from said floor to said table top.
11. An examination table comprising:
    an examination table top;
    scissor lift comprising a support for supporting said table top and a motor for activating said lift, thereby moving said table top in a generally vertical direction between a first position have a height and a second position, said second position having a height greater than said first position height;
    a shroud surrounding said table top, said table top being moveable within said shroud between said first and second positions while allowing access to said table top; and
    a hinged door in said shroud to provide an ingress for an animal to be examined.
12. The examination table of claim 11 further comprising a plurality of wheels connected to said table to allow said table to be moved.
13. A process for examining an animal comprising:
    leading the animal to an examination surface at a resting height, said resting height allowing the animal to mount the examination surface without assistance;
    surrounding said examination surface with a shroud prior to raising said examination surface;
    raising said examination surface within said shroud to an examination height; and
    examining said animal.
14. The process of claim 13 wherein said shroud includes an opening therein, in which said animal is lead through to said examination surface.
15. The process of claim 14 wherein said opening in said shroud is covered by a door, and said door is closed prior to raising said examination surface.
16. The process of claim 15 wherein said animal is lead through said door by means of a leash.

* * * * *